United States Patent [19]

Hyvärinen et al.

[11] Patent Number: 4,473,396

[45] Date of Patent: Sep. 25, 1984

[54] PROCEDURE FOR ROASTING SELENIFEROUS MATERIAL

[75] Inventors: Olli V. J. Hyvärinen, Suoniityntie; Leo E. Lindroos, Annikintie; Eino A. Rosenberg, Honkalantie, all of Finland

[73] Assignee: Dutokumpu Oy, Helsinki, Finland

[21] Appl. No.: 507,158

[22] Filed: Jun. 23, 1983

[30] Foreign Application Priority Data

Aug. 4, 1982 [FI] Finland .................................. 822714

[51] Int. Cl.³ ............................................. C22B 1/02
[52] U.S. Cl. ........................................ 75/7; 423/508; 423/510
[58] Field of Search ................. 75/7, 21, 23; 423/508, 423/510

[56] References Cited

U.S. PATENT DOCUMENTS 4,242,124 12/1980 Makipirtti .................................. 75/7

Primary Examiner—Peter D. Rosenberg
Attorney, Agent, or Firm—Brooks, Haidt, Haffner & Delahunty

[57] ABSTRACT

The invention concerns a procedure for separating selenium from seleniferous raw material by roasting this material with oxygen at elevated temperature in enclosed space.

With a view to improving the separation of selenium, the roasting is carried out in the presence of oxides of sulphur.

8 Claims, No Drawings

PROCEDURE FOR ROASTING SELENIFEROUS MATERIAL

The present invention concerns a procedure for separating selenium from seleniferous raw material by roasting the seleniferous raw material with oxygen or with gases containing oxygen, at elevated temperature in an enclosed space.

A number of processes have been developed for industrial use to produce selenium from seleniferous raw materials, in particular from the anode sludge of copper electrolysis. Of these procedures, those based on roasting the raw material are most often encountered in practice. The most important roasting methods are soda roasting and sulphuric acid, or sulphatizing, roasting.

Through the Finnish Pat. No. 46054 is known a sulphuric acid roasting process based on the following reactions:

1.
$$Ag_2Se + 4H_2SO_4 \rightarrow Ag_2SO_4 + SeO_2 + 2SO_2 + 4H_2O$$

2. $Se + 2H_2SO_4 \rightleftharpoons SeO_2 + 2SO_2 + 2H_2O$

The gaseous reaction products produced in the roasting process are conducted to absorption apparatus, in which the reaction (2) takes place from right to left, the selenium precipitating as elementary selenium.

In sulphuric acid roasting an excess of sulphuric acid has to be used and in the reactions themselves sulphur dioxide is formed in excess, whereby they cause sulphur discharge into the environment. The use of excess sulphuric acid also has the consequence that it becomes necessary to remove from the system considerable quantities of dilute sulphuric acid-containing absorption solution formed by the excess acid. The high investment costs of sulphuric acid roasting equipment and the high energy consumption as well as the conditions susceptible to corrosion are also factors which have caused the procedure to be further developed.

In prior art is also known a roasting method accomplished with gas, through the Finnish Pat. No. 28803, wherein only air or oxygen is used towards roasting. The drawback of this procedure is slow and incomplete separation of selenium. The procedure is carried out in such manner that the sulphur dioxide released in it during the treatment is minimized. By this procedure only about 95% of the elementary selenium are recovered. It is a further drawback of the method that the selenium cannot be directly precipitated by absorbing the gases from the roasting process in a liquid, because the gases do not contain the requisite reducing agent. Owing to the large gas quantities, it is usually necessary to use expensive, multi-step gas washing apparatus and an electric filter.

The unexpected observation has now been made that it is possible by roasting the solid seleniferous raw material in the gas phase in that at the roasting phase already exactly the correct quantity of sulphur dioxide is added, to achieve a high degree of separation of selenium and a short reaction time, while at the same time it reduces the selenium dioxide produced at roasting, directly in absorption apparatus. The invention leads to a simple and reliably operating process by which high capacity is reached in a manner more favourable to the environment, and by which in addition remarkable savings in apparatus cost are gained compared with methods of prior art.

Selenium can be roasted from seleniferous material with oxygen or with oxygen-carrying gases at elevated temperature. According to the present invention, into the furnace are additionally conducted, or in the furnace are generated, sulphur oxides, e.g. by evaporating sulphuric acid or by conducting sulphur dioxide into the furnace. A high degree of selenium separation is attained by the aid of the sulphur gases, and a short reaction time. Moreover, the separation is highly selective.

In the treatment of anodic sludge from copper electrolysis, the most important roasting reactions are:

(1) $Ag_2Se + SO_2 + 2O_2 \rightarrow Ag_2SO_4 + SeO_2$ (2) $Ag_2Se + 1\frac{1}{2}O_2 \rightarrow Ag_2O + SeO_2$ (3) $Ag_2Se + SO_3 + 1\frac{1}{2}O_2 \rightarrow Ag_2SO_4 + SeO_2$ (4) $Ag_2Se + 4SO_3 \rightarrow Ag_2SO_4 + SeO_2 + 3SO_3$ (5) $Se + O_2 \rightarrow SeO_2$ (6) $SO + O_2 \rightleftharpoons SO_3$ The requisite quantity of sulphur dioxide is regulated such that after the roasting reactions the sulphur dioxide quantity is approxiamately equivalent for reduction of the selenium dioxide that has been produced.

By the proper sulphur dioxide quantity is ensured immediate reduction of the selenium in the absorbtion equipment.

Sulphur oxides may be produced in a number of ways, in addition to direct sulphur dioxide introduction as follows, for instance: one may evaporate concentrated sulphuric acid and contact the vapours with the material to be roasted. Sulphuric acid is less expensive that sulphur dioxide gas, but it requires more energy, and it requires evaporating apparatus.

Another alternative is to admix elementary sulphur to the material to be roasted, which burns in the roasting process, producing sulphur dioxide gas and heat. It is also possible to burn sulphur separately and to conduct the hot sulphur dioxide gas into the roasting furnace.

It is possible in one alternative to admix to the material going to be roasted, a readily decomposing substance producing sulphur oxides, such as ammonium sulphate for instance. Different sulphur dioxide producing methods may also be employed side by side.

In likeness with sulphuric acid roasting, in the procedure of the present invention addition to diatomaceous earth to the material to be roasted has been found to promote the separation of selenium and to improve the properties of the material to be roasted. By the aid of diatomaceous earth, or another additive, the gas permeability of the material to be roasted is improved. The diatomaceous earth may be admixed in connection with the filtering carried out prior to roasting. The material to be roasted may be present e.g. in the form of a filter cake or equivalent, or briquetted or pelleted. A filter cake can be directly treated, but this may require a prolonged roasting time with heat transfer and contact with the gases inferior to those in the case of briquettes or pellets. Among the advantages afforded by the latter are their easier handling in further processes, such as smelting, and the circumstance that it is easy to add admixing substances to the material in connection with the briquetting or pelleting step. The drawback is the investment required for the necessary apparatus, and the extra work which the preparation requires.

The roasting temperature is 500°–800° C., preferably 600°–700° C. Heating of the furnace is most simply by direct electric heating, but it may also be accomplished e.g. by burning oil or gas.

The heat transfer to the material to be roasted takes place by radiation, convection or conduction. Heat transfer by convection and conduction e.g. with the aid of gas alone implies large gas quantities. For this reason the use of direct electric heating, using electric resistances as heat sources, is advantageous because no large gas quantities have to be used. The heat transfer to the material to be roasted may be improved by internal gas circulation in the furnace.

The procedure of the invention is characterized in that the temperature of the goods to be roasted is favourably 600°–700° C. and gas containing oxygen and sulphur oxides is conducted therethrough, and the gases in which selenium dioxide is formed, and which still contain a correctly regulated quantity of sulphur dioxide, are conducted to absorption apparatus, where the selenium is recovered, preferably as taught by the Finnish Pat. No. 46054. The faster the heat transfers to the material to be roasted, the sooner will the roasting start.

Moisture, which is often present in the raw material, retards the rising of the temperature, as the water is first evaporated.

The process of the invention may in principle be a charge process or continuous, or periodically continuous. The type is largely determined by the capacity required and by the requisite delay time in the roasting step. A charge process is vindicated at low capacities owing to its simplicity and since it ties up little labour. If it is found that a long delay time is needed, the charge process is still better because the apparatus size and number of units are the same in both alternatives, while the charge equipment requires less supervision and its investment cost is lower than that of continuously operating apparatus. If the requisite delay time is found to be short and if the required capacity is high, a continuous process can be motivated.

The following advantages are gained by the procedure of the invention, compared with earlier ways of processing:

In sulphuric acid roasting, sulphuric acid in excess has to be used, and in the reactions themselves sulphur dioxide is produced in excess. These give rise to sulphur discharge into the atmosphere. In the procedure of the invention, the sulphur dioxide is all used up in reducing selenium, and therefore there is virtually no sulphur discharge.

In the procedure of the invention there is produced much less sulphuric acid-containing absorption solution than what has to be removed from the system, since no sulphuric acid is used. In sulphuric acid roasting, a large part of the excess acid goes to form dilute sulphuric acid solution.

In the procedure of the invention, at least part of the silver remains unsulphatized, as studies have shown, and is probably present in the form of silver oxide. This facilitates the smelting of the goods and reduces the sulphur discharge at smelting.

In apparatus of sulphuric acid roasting there exists corrosion but the conditions required in the procedure of the invention are dry and thus there is no corrosion.

The energy consumption in the procedure of the invention is 20–50% compared with sulphuric acid roasting.

The degree of separation of selenium is high, typically 99% at least.

The purity of the precipitated selenium obtained is not less than 99.9%.

The procedure of the invention and the results obtainable by it are described in the following examples.

EXAMPLE 1

Roasting tests were made with anodic sludge in a laboratory furnace having the interior dimensions 80 mm×80 mm and in a vertical 100 mm×800 mm tubular furnace. The sludge was treated in three different forms: as pellets, briquettes and filter cake. In both first-mentioned, sodium bentonite was used as additive. The pellets were made on a pelleting plate or by hand. The briquettes were produced by pressing the sludge in a die. The briguette size was 19 mm×20–30 mm, and the pressure was 1800 bar. The maximum moisture content allowed in the sludge was 10–12%, depending on the content of diatomaceous earth.

Initial selenium content 7%
Anocid sludge in dried condition, in small cubes
Air flow 20 l/h
T=630 °C.
t=4 h, whereof 1 h of $SO_2$ supply in addition to air supply

Results 3 h, air alone, residual selenium 2.9%
1 h, air+$SO_2$ 6.5 l/h, residual selenium 0.1%

EXAMPLE 2

The same experimental arrangement and equipment as in Example 1, but different type sludges.
Sludge 1, initial content abt. 10% Se
Sludge 2, initial content abt. 25% Se
At first, air was supplied for 3 h at 20 l/h
Residual selenium: sludge 1 7.7%, sludge 2 16.7%
Hereafter, additional $SO_2$ supply was started at 6.5 l/h.
1.5 h $SO_2$, sludge 1 Se 0.1%, sludge 2 Se 4.6%
3.5 h $So_2$ sludge 2 Se 0.1%

EXAMPLE 3

Otherwise identical conditions as in Example 1, but sulphuric acid vapours instead of sulphur dioxide were conducted into the furnace.
3 h, air alone, residual selenium 2.8
1.75 h, air+$H_2SO_4$ vapours, residual selenium 0.1

EXAMPLE 4

Conditions of experiment as in Example 1.
Anodic sludge in pellet form
10% Na bentonite
3% diatomaceous earth
30% $(NH_4)_2SO_4$
admixed to the anodic sludge.
T=600° C.
Initial content, selenium abt. 7%.

Results 1 h oxygen blowing
0.5 h oxygen blowing+sulphuric acid vapours
Resicual selenium 0.4%.

EXAMPLE 5

Trial with anodic sludge, initial content abt. 7% Se.
Sludge in various forms.
T = 600° C.
T = 6 h
Sulphuric acid was evaporated into the furnace.
Residual selenium:

|     |                                                         | Se, % |
| --- | ------------------------------------------------------- | ----- |
| (1) | Pellets, no additives                                   | 1.2   |
| (2) | Pellets, 3% diatomaceous                                | 0.1   |
| (3) | Pellets, 3% diatonamceous earth + 10% $(NH_4)_2SO_4$    | 0.1   |
| (4) | Briquettes, no additives                                | 2.3   |
| (5) | briquettes, 3% diatomaceous earth                       | 0.9   |
| (6) | Briquettes, 3% diatomaceous earth + 10% $(NH_4)_2SO_4$  | 0.1   |

We claim:

1. Procedure for separating selenium as elemental selenium from seleniferous raw material by roasting the raw material with oxygen or with oxygen-carrying gases at an elevated temperature in an enclosed space, comprising carrying out the roasting in the presence of sulphur oxides for improved separation of selenium.

2. Procedure according to claim 1, wherein the sulphur oxide quantity in the roasting process is regulated to be such that after roasting there is sulphur oxide roughly in equivalent quantity regarding the selenium dioxide that has been produced for the reduction thereof.

3. Procedure according to claim 1 or 2, wherein sulphur dioxide gas is conducted to the roasting process, or the requisite sulphur oxide is produced by evaporating concentrated sulphuric acid or by admixing to the material to be roasted elementary sulphur or a readily decomposable substance producing sulphur oxides.

4. Procedure according to claim 1 or 2 wherein the material to be roasted is in the form of a solid filter cake, of briquettes or of pellets.

5. Procedure according to claim 1 or 2 wherein the roasting temperature is 500°–800° C.

6. Procedure according to claim 5, wherein the roasting temperature is 600°–700° C.

7. Procedure according to claim 3, ammonium sulphate is used as the substance producing sulphur oxide.

8. Procedure according to claim 1 or 2 wherein seleniferous sludge accruing in electrolytic plants is the raw material.

* * * * *

UNITED STATES PATENT AND TRADEMARK OFFICE
CERTIFICATE OF CORRECTION

PATENT NO. : 4,473,396
DATED : September 25, 1984
INVENTOR(S) : Olli V.J. Hyvarinen et al It is certified that error appears in the above-identified patent and that said Letters Patent is hereby corrected as shown below:

In the Title Page:

"[73] Assignee: Dutokumpu Oy, Helsinki, Finland" should be:

--[73] Assignee: Outokumpu Oy, Helsinki, Finland--.

Column 4, line 26:

"Anocid" should read: --Anodic--.

Signed and Sealed this

Nineteenth Day of February 1985

[SEAL]

Attest:

DONALD J. QUIGG

Attesting Officer        Acting Commissioner of Patents and Trademarks